United States Patent [19]

Han

[11] Patent Number: 5,237,289
[45] Date of Patent: Aug. 17, 1993

[54] MOSFET CONTROLLING MULTIPLIER

[75] Inventor: Il S. Han, Seoul, Rep. of Korea

[73] Assignee: Korea Telecommunication Authority, Seoul, Rep. of Korea

[21] Appl. No.: 900,330

[22] Filed: Jun. 18, 1992

[30] Foreign Application Priority Data

Nov. 1, 1991 [KR] Rep. of Korea ............... 1991-19375

[51] Int. Cl.$^5$ .............................................. H03F 3/16
[52] U.S. Cl. ..................................... 330/277; 307/501
[58] Field of Search ............... 307/490, 491, 497, 501, 307/201; 330/9, 277

[56] References Cited

U.S. PATENT DOCUMENTS 4,760,349 7/1988 Park et al. ..................... 330/277 X
4,825,174 4/1989 Vella-Coleiro ..................... 330/277

OTHER PUBLICATIONS

New Four-Quadrant CMOS Analogue Multiplier, Electronics letters 19th Nov. 1987, vol. 23, pp. 1268–1270.
A20-V Four-Quad CMOS Analogue Multiplier, IEEE Journal of Solid-State Circuit, vol. SC-20, No. 6, pp. 1158–1167, Dec. 1985.

*Primary Examiner*—Steven Mottola
*Attorney, Agent, or Firm*—Seed and Berry

[57] ABSTRACT

A MOSFET controlling multiplier for obtaining the precise function of the operational multiplication by offsetting the offset voltage of MOSFET to remove the non-linear current of MOSFET, utilizing symmetrical voltage sources and a current mirror circuit is disclosed. The MOSFET controlling multiplier utilizes a MOSFET linear means for linearly varying the output current I to a node A in accordance with an input voltage from an input voltage source Vg and a symmetrical input voltage from voltage sources Vx and −Vx. The input voltage from the input voltage source Vg is operatively associated with the symmetrical input voltage from the voltage sources Vx and −Vx. An impedance element Z outputs a voltage Vo, with the impedance element Z being connected to the node A of the MOSFET linear means and the ground.

16 Claims, 4 Drawing Sheets

MOSFET CONTROLLING MULTIPLIER

BACKGROUND OF INVENTION

Field of the Invention

The invention relates to a MOSFET controlling multiplier, and more particularly, to a MOSFET controlling multiplier for obtaining the precise function of the operational multiplication by offsetting the offset voltage of a MOSFET by utilizing symmetrical voltages applied across a resistive MOSFET and a current mirror circuit constituted therein, in order to remove the non-linear current of MOSFET and to thereby considerably improve the accuracy of the multiplier.

Information Disclosure Statement

Upon developing VLSI (Very Large Scale Integration) technology, a need arose to bring integration technology not only into digital systems, but also into analog systems. Thus, the digital technology is utilized in for example, computers, and also in a novel field capable of accomplishing either a humanization or use of a neural network of communication technics between remote controlled systems or between user connections. Under these circumstances, there are limits in the digital system of the prior art VLSI technology both from a classical sense of the algorithm aspect, and from a simulated realization aspect, that is, a real connection from the external. For the multiplication process, which is based on a procedure which utilizes VLSI technology, problems result since the width required for the necessary chips increases considerably and the system operational speed for realizing the synchronizing operation of the system is limited. In addition, the technology of the analog integrated circuit has difficulty in realizing the VLSI technology due to its restricted precision and difficulty in system design.

Therefore, it is an object of the present invention to solve the problems set forth above and to provide a MOSFET controlling multiplier by providing the precise function of the operational multiplication utilizing both a VLSI technology which has the advantage of achieving the digital system and a novel analog integrated circuit.

Further, it is an another object of the present invention to provide an analog-digital hybrid of an artificial neural synapse to realize a scheme for the new generation of computer technology.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The MOSFET analog multiplier of the present invention is defined by the claims with a specific embodiment shown in the attached drawings. For the purpose of summarizing the invention, the invention relates to a MOSFET controlled multiplier which comprises MOSFET linear means 1 for linearly varying the output current I output to a node A, i.e. a particular connection point, in accordance with an input voltage from an input voltage source Vg and a symmetrical input voltage from voltage sources Vx and −Vx. The input voltage from the input voltage source Vg is operatively associated with the symmetrical input voltage from the voltage sources Vx and −Vx, when in operation. An impedance element Z outputs a voltage Vo, with the impedance element Z being connected to the node A of the MOSFET linear means 1 and the ground.

The MOSFET linear means preferably includes a first resistive element 10 operatively connected to a voltage source Vx and to a drain electrode of a MOSFET M1. (The phrase "operatively connected" means that the particular element is connected in the circuit according to the present invention in a manner to achieve the purpose of the circuit, i.e. for the MOSFET linear means 1 to output a linearly varying current I and the impedance element Z to output a voltage Vo.) A gate electrode of the MOSFET M1 is connected to a voltage source Vg. A second resistive element 20 is connected to a voltage source −Vx and to a source electrode of the MOSFET M1. A first current source 30, which operates as a current source for offset control, is connected to the voltage source Vx and to the node A. A second current source 40 for current mirror circuit is operatively connected to the node A, and to the voltage source −Vx.

The first resistive element 10 is preferably a MOSFET M4 with its gate electrode and drain electrode operatively connected to each other to connect to the voltage source Vx and with its source electrode connected to the drain electrode of the MOSFET M1.

The second resistive element 20 is preferably a MOSFET M5 with its drain electrode and gate electrode operatively connected to each other to connect to the source electrode of the MOSFET M1, and with its source electrode connected to the voltage source −Vx.

The first current source 30 is preferably a MOSFET M3 with its drain electrode operatively connected to the voltage source Vx and to the first resistive element 10 and with a source electrode operatively connected to the node A and a gate electrode connected to a reference voltage of a voltage source Vr.

The second current source 40 is preferably a MOSFET M2 with its drain electrode operatively connected to the node A and with its source electrode and gate electrode operatively connected to the second resistive element 20 and the voltage source −Vx.

A MOSFET M8 may be operatively connected between the node A and the impedance element Z. The gate electrode of the MOSFET M8 receives a neural state signal thereby operating as a neural synapse network.

A MOSFET M6 may be operatively interposed between the voltage source Vx and the MOSFET linear means 1 to receive voltage from the voltage source Vx. A MOSFET M7 may be operatively interposed between the voltage source −Vx and the MOSFET linear means 1 to receive voltage from the voltage source −Vx, with each MOSFET M6 and M7 further including gate electrodes which are connected to each other in order to receive a neural state signal to thereby operate as a neural synapse network.

The preferred MOSFET multiplier circuit comprises a number of MOSFETs and a impedance element. More definitively, the preferred MOSFET multiplier comprises a MOSFET M1 with a source electrode, a drain electrode and a gate electrode with the gate electrode connected to a voltage source Vg. A MOSFET M4 is used with its gate electrode and drain electrode operatively connected to each other to connect to a voltage source Vx, and with its source electrode connected to the drain electrode of the MOSFET M1. A MOSFET M5 is utilized with its drain electrode and gate electrode operatively connected to each other to connect to the source electrode of the MOSFET M1, and with its source electrode connected to a voltage source −Vx. A MOSFET M3 is used with its drain electrode connected to the voltage source Vx and with its source electrode connected to the node A and with its gate electrode connected to receive a reference voltage of a voltage source Vr. A MOSFET M2 which has a source electrode, a gate electrode and a drain electrode is used in the multiplier. The drain electrode of the MOSFET M2 is operatively connected to the node A, the source electrode of the MOSFET M2 is operatively connected to the source electrode of the MOSFET M5 and to the voltage source −Vx, and the gate electrode of the MOSFET M2 is operatively connected to the gate electrode of the MOSFET M3 and the source electrode of MOSFET M1. The impedance element Z is used for outputting a voltage Vo, with the impedance element Z being connected to the node A and the ground.

Preferably the MOSFET multiplier further includes a MOSFET M8 operatively connected between the node A and the impedance element Z with the gate electrode of the MOSFET M8 receiving a neural state signal and thereby operating as a neural synapse network.

The MOSFET multiplier includes a number of operatively connected MOSFETs M1, M2, M3, M4 and M5 which define a MOSFET linear means 1. The MOSFET multiplier preferably further includes a MOSFET M6 operatively interposed between the voltage source Vx and the MOSFET linear means 1 in order to interconnect the voltage source Vx and the MOSFET linear means 1. A MOSFET M7 is operatively interposed between the voltage source −Vx and the MOSFET linear means 1 in order to interconnect the voltage source −Vx and the MOSFET linear means 1. Each MOSFET M6 and M7 further includes a gate electrode which are connected to each other and receive a neural state signal thereby operating as a neural synapse network. That is, MOSFETs M6 and M7 are electrically connected between voltage sources Vx, −Vx and the MOSFET linear means 1, respectively, and their gate electrodes are connected together for receiving a neural state signal and thereby operate as a neural synapse network. An impedance element Z outputs a voltage Vo, with the impedance element Z being connected to the node A and the ground.

In the preferred embodiment the MOSFET M6 is operatively connected to the voltage source Vx and to the MOSFETs M4 and M3 of the MOSFET linear means 1. The MOSFET M7 is operatively connected to the voltage source −Vx and to the MOSFETs M2 and M5 of the MOSFET linear means 1, and with each MOSFET M6 and M7 further including gate electrodes connected to each other to receive a neural state signal thereby operating as a neural synapse network.

The more pertinent and important features of the present invention have been outlined above in order that the detailed description of the invention which follows will be better understood and that the present contribution to the art can be fully appreciated Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION OF THE INVENTION

Figure 1A:
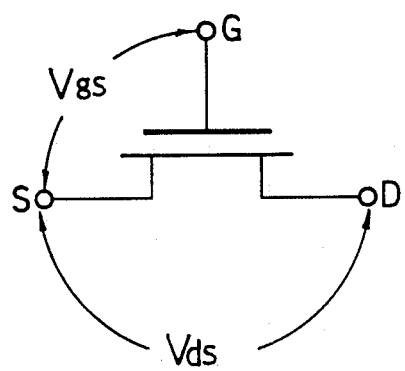
FIG. 1A is a symbol of a MOSFET.

FIG. 1A depicts a symbol of a MOSFET having a gate electrode, a source electrode and a drain electrode.

Figure 1B:
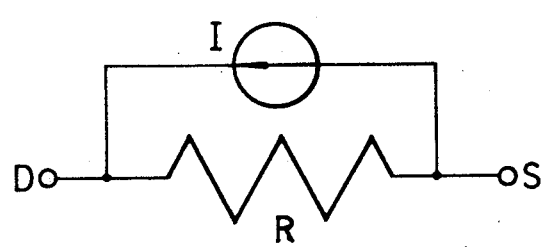
FIG. 1B illustrates an equivalent circuit in a non-saturation region of MOSFET.

FIG. 1B shows an equivalent circuit of a MOSFET in non-saturation region, in which the drain current characteristics at the resistance region can be expressed by the following equations:

$$I = \frac{Cox \cdot W \cdot \mu}{2L} \cdot (-V^2ds) \qquad (1)$$

$$\frac{1}{R} = \frac{(Cox \cdot W \cdot \mu)}{L} \cdot (Vgs - Vt) \qquad (2)$$

Where

μ: the mobility of the majority carrier.

Cox: the gate capacitance per unit area.

L: the length of the channel.

W: the width of the channel (perpendicular direction to L).

Vds: the voltage between the drain electrode and the source electrode.

Vgs the voltage between the gate electrode and the source electrode.

Vt the threshold voltage.

Figure 2:
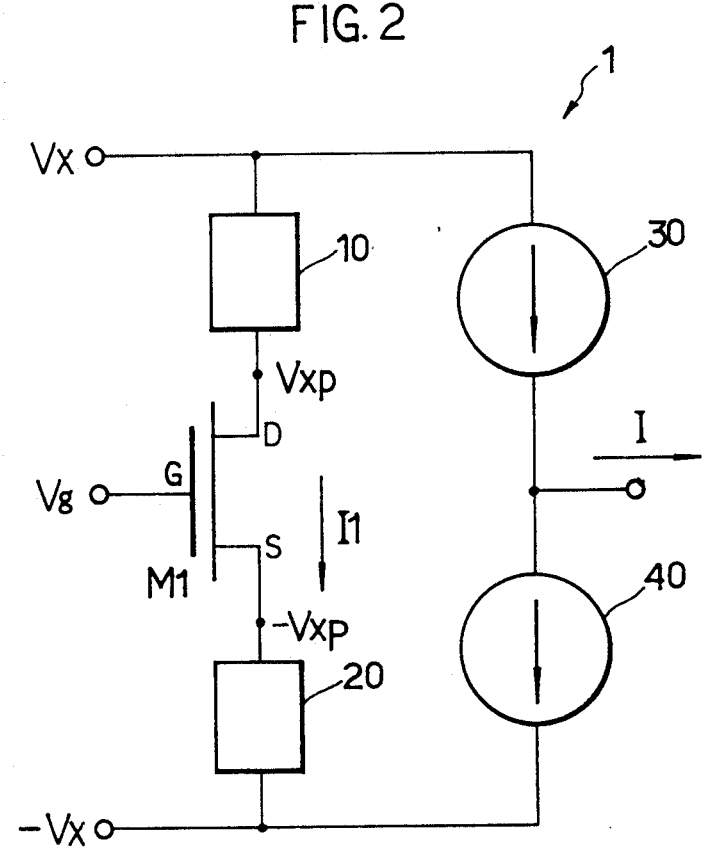
FIG. 2 illustrates a simplified diagrammatic circuit according to the present invention.

FIG. 2 is a schematic view of the present invention in which, a voltage source Vx is connected, through a first resistive element 10, a MOSFET M1 and a second resistive element 20, to a voltage source −Vx. Further, the voltage source Vx is also connected, through a first current source 30, a node A and a second current source 40, to the voltage source −Vx. Furthermore, the potential level Vxp of the drain electrode of the MOSFET M1 has a symmetrical relationship relative to the potential level −Vxp of the drain electrode of the MOSFET M1. A voltage source Vg is applied to the gate electrode of the MOSFET M1, the operational description of which will be described hereinafter. It is noted that, as fully appreciated from the drawing, the voltage sources Vx and −Vx supply symmetrical input voltages to the circuit, simultaneously.

Referring to the drawing, the current I1 flowing through the resistive MOSFET M1 can be expressed by the equation as follows:

$$\begin{aligned} I1 &= (Cox \cdot W \cdot u)/L[(Vgs - Vt) Vds - V^2ds/2] \\ &= a[(Vg + Vxp - Vt) 2Vxp - 4Vxp^2/2] \\ &= a(Vg - Vt) 2Vxp \\ &= a \cdot Vg \cdot Vds - \beta \end{aligned} \quad (3)$$

Where,
$a = (Cox \cdot W \cdot \mu)/L$
$Vd = Vxp, Vs = -Vxp$
$Vds = 2Vxp$ and $\beta$ is an offset term.

Therefore, from the equation (3), if β-term is offset by using a current source (such as for example, a current mirror circuit) having the same magnitude as that of the current source I for eliminating the offset term, the quadratic term is eliminated from the equation (1), so that the resulting current I is given a value which is in proportion to the product of the input voltages from the voltage sources Vg and Vds, which results in the basis capable of applied to as a multiplier.

Figure 3:
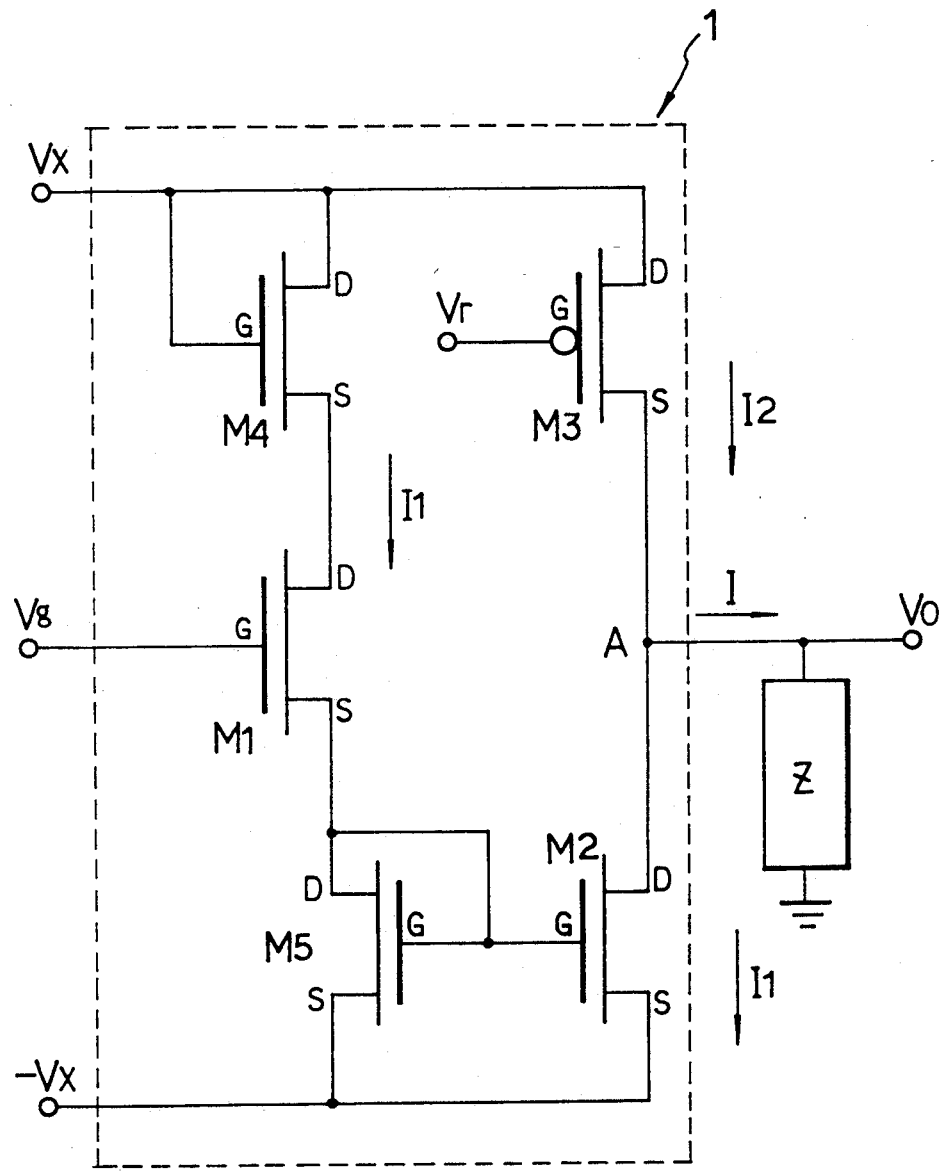
FIG. 3 illustrates a circuit of the MOSFET controlling multiplier according to the present invention.

FIG. 3 represents a circuit of MOSFET multiplier according to the present invention, the voltage source Vx is connected, through a MOSFET M4 with a gate electrode being connected to their drain electrode, the MOSFET M1 with the voltage of the voltage source Vg being applied to their gate electrode, and a MOSFET M5 with a gate electrode being connected to their drain electrode, to the voltage source −Vx. Further, the voltage source Vx is also connected, through a MOSFET M3 which operates as a current source for offset control, a node B, i.e. a particular connection point, and a MOSFET M2 for current mirror circuit having a gate electrode connected to the gate electrode of the MOSFET M5, to the voltage source −Vx, thereby forming a MOSFET linear means 1 having input terminals which are connected to the voltage sources Vx and −Vx, respectively. The node A is connected to output an output voltage Vo and is also connected, through an impedance element Z, to the ground, the operational description of which will be described hereinafter.

Referring to the drawing, since the output current I lows linearly due to both the current I1, which is equivalent to the current flowing through the MOSFET M1, flowing through the MOSFET M2 which operates as an current mirror circuit and the current I2, which operates as a current source for offset control, flowing through the MOSFET M3, the output voltage Vo is outputted by the impedance element where the output voltage Vo is given a value which is in proportion to the product of the input voltages from the voltage source Vx and Vg. Such an operational product function can be realized by adopting a circuit of FIG. 3 according to the invention in which the primary linear relationship at the non-saturation region of MOSFET is highlighted thereto. It is noted that a reference voltage Vr is applied to the gate electrode of MOSFET M3 to control the current flowing through the MOSFET M2 as being equally set to the current flowing through the MOSFET M1.

Figure 4:
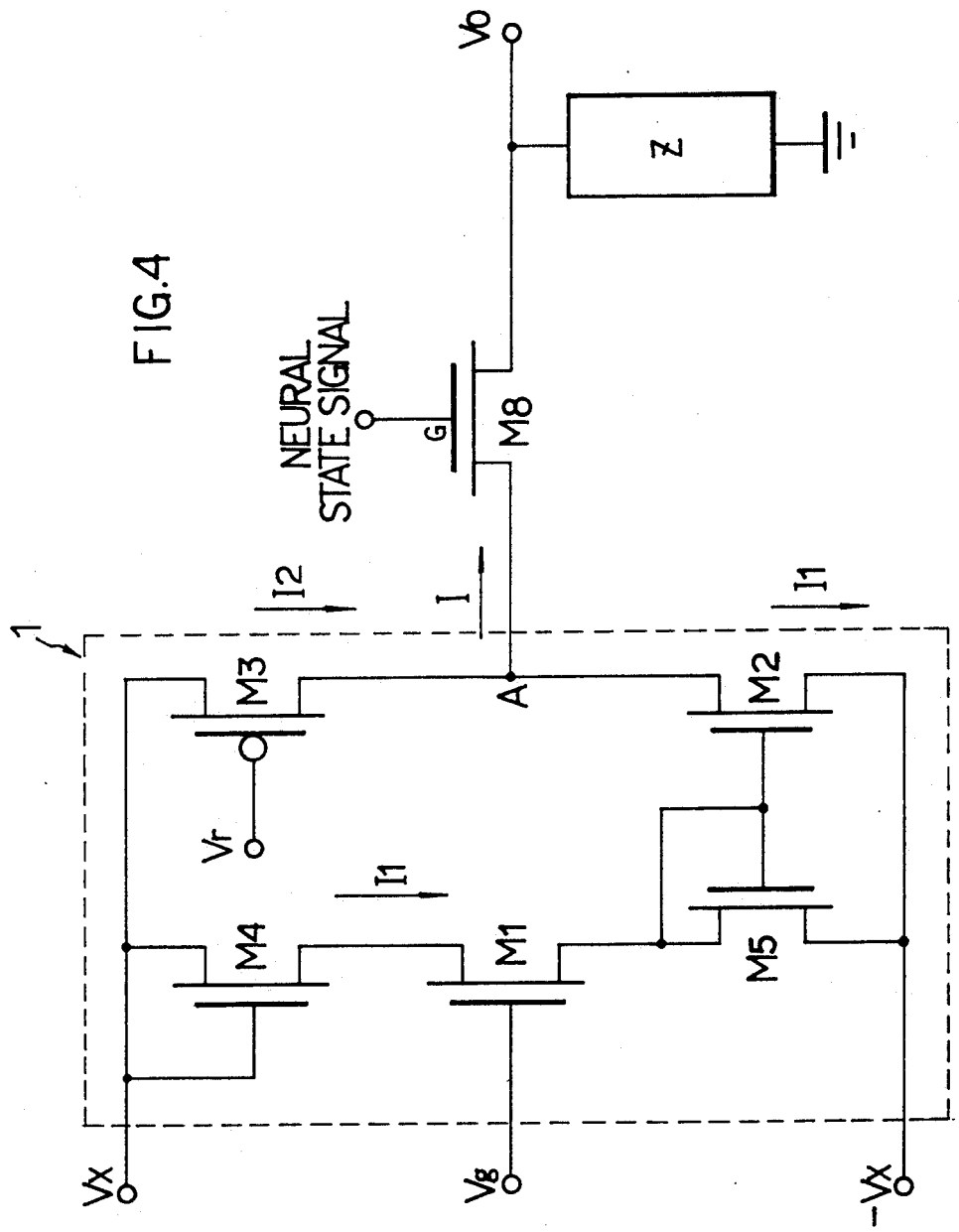
FIG. 4 illustrates a first embodiment of the present invention.

FIG. 4 illustrates a first embodiment of the present invention, in which in connection with FIG. 4, a MOSFET M8 is connected between the node A and the impedance element Z so as to receive signal of neural state through their gate electrode, which whereby operates as a neural synapse network. According to the embodiment described above, if the voltage from the voltage source Vx is set to a predetermined level, the voltage from the voltage source Vg functions as a synapse weight of neural network and the pulse signal of neural state is applied to gate electrode of the MOSFET M8, a circuit for realizing the basic structure of neural synapse network which electrically stores the neural state by using a integration capacitor, not shown, can be obtained. It can also be accomplished a novel hybrid neural synapse network that through it utilizes a few MOSFETs, yet it is possible to obtain a completely asynchronous operation having a high speed in processing time.

Figure 5:
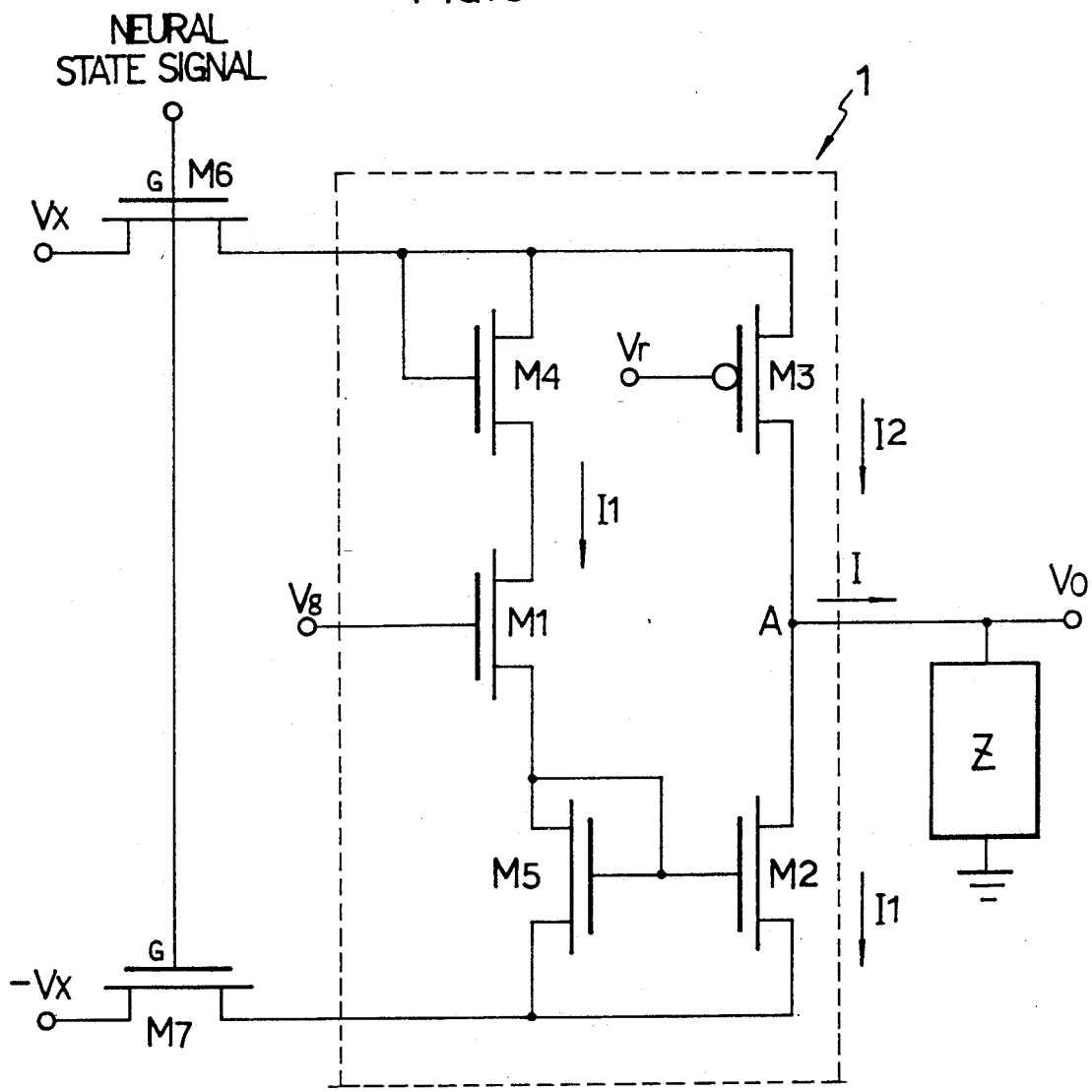
FIG. 5 illustrates a second embodiment of the present invention.

FIG. 5 shows a second embodiment of the present invention, in which, in relation to FIG. 5, MOSFETs M6 and M7 can be provided at the input terminals, that is, both between the voltage source Vx and the MOSFET M4, and between the voltage source −Vx and the MOSFET M5, respectively. The gate electrodes of the MOSFETs M6 and M7 are connected to each other, thereby enabling the input signal of neural state to be inputted therethrough. Therefore, if there is no input signal applied thereto, the consumption current existing at the MOSFETs M1 and M2 can be eliminated.

According to the second embodiment of the present invention, another novel neural synapse network which minimizes the consumption of the power required for highly integrity of the system is illustrated.

As described above, according to the invention, it can be not only obtained a simple and an accurate operational results by utilizing the primary linear characteristics of MOSFET, but also accomplished a mixed analog-digital type of artificial neural synapse network that is available in realizing the neural network, so that the technical principle according to the present invention can be advantageously applied to the new generation computer systems.

Although this invention has been described in its preferred form with a certain degree of particularity, it is appreciated by those skilled in the art that the present disclosure of the preferred form has been made only by way of example and that numerous changes in the details of the construction, combination and arrangement of pars may be resorted to without departing from the spirit and scope of the invention.

What is claimed is:

1. A MOSFET controlling multiplexer which comprises:
   a MOSFET linear means 1 for linearly varying the output current I to a node A in accordance with an input voltage from an input voltage source Vg and a symmetrical input voltage from voltage sources Vx and −Vx operatively associated with said symmetrical input voltage form said voltage sources Vx and −Vx, with said MOSFET linear means including a first resistive element 10 operatively connected to a voltage source Vx;
   a MOSFET M1 having a gate electrode connected to a voltage source Vg, a drain electrode operatively connected to said first resistive element 10, and a source electrode;

a second resistive element 20 connected to a voltage source −Vx and to aid source electrode of said MOSFET M1;

a first static current source 30 which operates as a current source for offset control connected to said voltage source Vx and to said node A;

a second static current source 40 for current mirror circuit operatively connected to said node A, and to said voltage source −Vx; and an impedance element Z for outputting a voltage Vo, with said impedance element Z being connected to said node A of said MOSFET linear means 1 and ground.

2. The MOSFET multiplier of claim 1 wherein said first resistive element is a MOSFET M4 with a gate electrode and drain electrode operatively connected to each other to connect to said voltage source Vx, and with a source electrode connected to said drain electrode of said MOSFET M1.

3. The MOSFET multiplier of claim 1 wherein said second resistive element is a MOSFET M5 with a drain electrode and gate electrode operatively connected to each other to connect to said source electrode of said MOSFET M1, and with a source electrode connected to said voltage source −Vx.

4. The MOSFET multiplier of claim 1 wherein said first current source is a MOSFET M3 with a drain electrode connected to said voltage source Vx and said first resistive element and with a source electrode connected to said node A and a gate electrode connected to receive a reference voltage from a voltage source Vr.

5. The MOSFET multiplier of claim 1 wherein said second current source is a MOSFET M2 with a drain electrode operatively connected to said node A and with a source electrode operatively connected to said second resistive element and said voltage source −Vx.

6. The MOSFET multiplier of claim 1 wherein said second current source is a MOSFET M2 operatively connected to said node A and operatively connected to said voltage source −Vx; said second resistive element is a MOSFET M5 with a drain electrode and gate electrode connected to each other to connect to said source electrode of said MOSFET M1, a source electrode connected to said voltage source −Vx, and a gate electrode connected to a gate electrode of said MOSFET M2 and to said source electrode of said MOSFET M1.

7. The MOSFET multiplier of claim 1 wherein said second resistive element is a MOSFET M5 and said second current source is a MOSFET M2;

said second resistive element is a MOSFET M5 with a drain electrode connected to said source electrode of said MOSFET M1 and with a source electrode connected to said voltage source −Vx and with a gate electrode connected to a gate electrode of said MOSFET M2 and to said source electrode of said MOSFET M1; and said second current source is a MOSFET M2 operatively connected to said node A and with a source electrode operatively connected to said source electrode of said MOSFET M5 and to said voltage source −Vx.

8. The MOSFET multiplier of claim 1 further including a MOSFET M8 operatively connected between said node A of said MOSFET linear means and said impedance element Z and having a gate electrode for receiving a neural state signal thereby operating as a neural synapse network.

9. The MOSFET multiplier of claim 1 further includes a MOSFET M6 operatively interposed between said voltage source Vx and said MOSFET linear means to receive voltage from said voltage source Vx; and a MOSFET M7 operatively interposed between said voltage source −Vx and said MOSFET linear means to receive voltage from said voltage source −Vx, with each said MOSFETs M6 and M7 further including gate electrodes connected to each other to receive a neural state signal thereby operating as a neural synapse network.

10. A MOSFET multiplier comprising:

a MOSFET M1 having a source electrode, a drain electrode and a gate electrode with said gate electrode connected to a voltage source Vg;

a MOSFET M4 having a gate electrode and a drain electrode operatively connected to each other to connect to a voltage source Vx, and a source electrode connected to said drain electrode of said MOSFET M1;

a MOSFET M5 having a source electrode, a gate electrode and a drain electrode with said drain electrode and said gate electrode operatively connected to each other to connect to said source electrode of said MOSFET M1, and with said source electrode connected to a voltage source −Vx;

a MOSFET M3 with a drain electrode connected to said drain electrode and gate electrode of said MOSFET M4 and to said voltage source Vx and with a source electrode connected to a node A and a gate electrode connected to receive a reference voltage from a voltage source Vr;

a MOSFET M2 having a source electrode, a gate electrode and a drain electrode with said drain electrode operatively connected to said node A and with said source electrode operatively connected to said source electrode of said MOSFET M5 and to said voltage source −Vx; and an impedance element Z for outputting a voltage Vo, with said impedance element Z being connected to said node A and the ground.

11. The MOSFET multiplier of claim 10 further including a MOSFET M8 operatively connected between said node A and said impedance element Z and having a gate electrode for receiving a neural state signal thereby operating as a neural synapse network.

12. The MOSFET multiplier of claim 10 wherein said operatively connected MOSFETs M1, M2, M3, M4 and M5 define a MOSFET linear means and said MOSFET multiplier further includes a MOSFET M6 operatively interposed between said voltage source Vx and said MOSFET linear means to receive voltage from said voltage source Vx; and a MOSFET M7 operatively interposed between said voltage source −Vx and said MOSFET linear means to receive voltage from said voltage source −Vx, with said each MOSFET M6 and M7 further including gate electrodes connected to each other to receive a neural state signal thereby operating as a neural synapse network.

13. The MOSFET multiplier of claim 12 wherein said MOSFET M6 is operatively connected to said voltage source Vx and to said MOSFETs M4 and M3 of said MOSFET linear means to receive voltage from said voltage source Vx; and said MOSFET M7 is operatively connected to said voltage source −Vx and to said MOSFETs M2 and M5 of said MOSFET linear means to receive voltage from said voltage source −Vx, with said each MOSFET M6 and M7 further including gate electrodes connected to each other to receive a neural state signal thereby operating as a neural synapse network.

14. A MOSFET multiplier comprising:

a MOSFET M1 having a source electrode, a drain electrode and a gate electrode with said gate electrode connected to a voltage source Vg;

a MOSFET M4 having a gate electrode and a drain electrode operatively connected to each other to connect to a voltage source Vx, and a source electrode connected to said drain electrode of said MOSFET M1;

a MOSFET M5 having a source electrode, a gate electrode and a drain electrode with said drain electrode and said gate electrode operatively connected to each other to connect to said source electrode of said MOSFET M1, and with said source electrode connected to a voltage source −Vx;

a MOSFET M3 with a drain electrode connected to said drain electrode and gate electrode of said MOSFET M4 and to said voltage source Vx and with a source electrode connected to a node A and a gate electrode connected to receive a reference voltage from a voltage source Vr;

a MOSFET M2 having a source electrode, a gate electrode and a drain electrode with said drain electrode operatively connected to said node A and with said source electrode operatively connected to said source electrode of said MOSFET M5 and to said voltage source −Vx;

an impedance element Z for outputting a voltage Vo, with said impedance element Z being connected to said node A and the ground; and a MOSFET M8 operatively connected between said node A and said impedance element Z and having a gate electrode for receiving a neural state signal thereby operating as a neural synapse network.

15. A MOSFET multiplier comprising:

a MOSFET M1 having a source electrode, a drain electrode and a gate electrode with said gate electrode connected to a voltage source Vg;

a MOSFET M4 having a gate electrode and a drain electrode operatively connected to each other to connect to a voltage source Vx, and a source electrode connected to said drain electrode of said MOSFET M1;

a MOSFET M5 having a source electrode, a gate electrode and a drain electrode with said drain electrode and said gate electrode operatively connected to each other to connect to said source electrode of said MOSFET M1, and with said source electrode connected to a voltage source −Vx;

a MOSFET M3 with a drain electrode connected to said drain electrode and gate electrode of said MOSFET M4 and to said voltage source Vx and with a source electrode connected to a node A and a gate electrode connected to receive a reference voltage from a voltage source Vr;

a MOSFET M2 having a source electrode, a gate electrode and a drain electrode with said drain electrode operatively connected to said node A and with said source electrode operatively connected to said source electrode of said MOSFET M5 and to said voltage source −Vx;

an impedance element Z for outputting a voltage Vo, with said impedance element Z being connected to said node A and the ground;

said operatively connected MOSFETs M1, M2, M3, M4 and M5 define a MOSFET linear means;

a MOSFET M6 operatively interposed between said voltage source Vx and said MOSFET linear means to receive voltage from said voltage source Vx; and a MOSFET M7 operatively interposed between said voltage source −Vx and said MOSFET linear means to receive voltage from said voltage source −Vx, with each said MOSFETs M6 and M7 further including gate electrodes connected to each other to receive a neural state signal thereby operating as a neural synapse network.

16. The MOSFET multiplier of claim 15 wherein said MOSFET M6 is operatively connected to said voltage source Vx and to said MOSFETs M4 and M3 of said MOSFET linear means to receive voltage from said voltage source Vx; and said MOSFET M7 is operatively connected to said voltage source −Vx and to said MOSFETs M2 and M5 of said MOSFET linear means to receive voltage from said voltage source −Vx, with each said MOSFETs M6 and M7 further including gate electrodes connected to each other to receive a neural state signal thereby operating as a neural synapse network.

* * * * *